(12) United States Patent
Kim

(10) Patent No.: US 7,703,177 B2
(45) Date of Patent: Apr. 27, 2010

(54) HINGE DEVICE AND MOBILE APPARATUS HAVING THE SAME

(75) Inventor: Jin-wook Kim, Gimcheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 850 days.

(21) Appl. No.: 11/447,121

(22) Filed: Jun. 6, 2006

(65) Prior Publication Data

US 2007/0136997 A1 Jun. 21, 2007

(30) Foreign Application Priority Data

Dec. 19, 2005 (KR) .................... 10-2005-0125570

(51) Int. Cl.
*E05D 3/06* (2006.01)
*E05D 15/00* (2006.01)

(52) U.S. Cl. ............... 16/366; 16/239; 16/357; 16/360; 16/361; 16/362; 16/367

(58) Field of Classification Search ........... 16/337–339, 16/342, 330, 303, 374, 376, 377, 340, 355, 16/239, 357, 360, 361, 362, 367; 361/679.06, 361/679.07, 679.08, 679.12, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | | |
|---|---|---|---|---|
| 2,770,834 A | * | 11/1956 | Jannace | .................. 16/250 |
| 4,852,032 A | * | 7/1989 | Matsuda et al. | ........ 361/679.27 |
| 5,061,023 A | * | 10/1991 | Soubliere et al. | ......... 312/223.4 |
| 5,107,402 A | * | 4/1992 | Malgouires | ............ 361/679.17 |
| 5,494,447 A | * | 2/1996 | Zaidan | ........................ 439/31 |
| 5,946,774 A | * | 9/1999 | Ramsey et al. | ................ 16/357 |
| 6,381,125 B1 | * | 4/2002 | Mizoguchi et al. | ..... 361/679.08 |
| 7,278,184 B2 | * | 10/2007 | Kuramochi | .................. 16/357 |
| 2001/0004269 A1 | | 6/2001 | Shibata et al. | |
| 2004/0127266 A1 | | 7/2004 | Aagaard et al. | |
| 2005/0044664 A1 | * | 3/2005 | Chang | ........................ 16/327 |
| 2005/0050687 A1 | | 3/2005 | Shiba | |
| 2005/0107137 A1 | | 5/2005 | Byun et al. | |
| 2005/0122311 A1 | | 6/2005 | Lee et al. | |
| 2006/0025184 A1 | | 2/2006 | Cho et al. | |

FOREIGN PATENT DOCUMENTS

| | | |
|---|---|---|
| CN | 1620238 A | 5/2005 |
| CN | 1630312 A | 6/2005 |
| EP | 1 531 604 | 5/2005 |
| EP | 1 542 433 | 6/2005 |
| JP | 2005-054891 | 3/2005 |
| KR | 10-2003-0017321 | 3/2003 |

* cited by examiner

*Primary Examiner*—Chuck Y. Mah
(74) *Attorney, Agent, or Firm*—Roylance, Abrams, Berdo & Goodman, L.L.P.

(57) ABSTRACT

A mobile apparatus includes a main body, a display part, and a hinge device. The hinge device opens and closes the display part from the main body and allows the display part to rotate. The hinge device includes a sliding unit that slides with respect to the main body, and a rotary unit rotatably formed with the sliding unit to engage the display part. The hinge device requires less installation space so that the mobile apparatus may be more compact. Furthermore, there is no visible installation line of the hinge device so that the mobile apparatus may have a more refined design.

26 Claims, 15 Drawing Sheets

HINGE DEVICE AND MOBILE APPARATUS HAVING THE SAME

CROSS-REFERENCE TO RELATED APPLICATIONS

This application claims the benefit under 35 U.S.C. § 119(a) of Korean Patent Application No. 2005-125570 filed on Dec. 19, 2005, in the Korean Intellectual Property Office, the entire disclosure of which is hereby incorporated by reference.

BACKGROUND OF THE INVENTION

1. Field of the Invention

The present invention relates to a mobile apparatus. More particularly, the present invention relates to a smaller, simpler hinge device, and a mobile apparatus having the same.

2. Description of the Related Art

A mobile apparatus such as a mobile phone or a camcorder has a display part that can rotate away from a main body. Accordingly, a user opens the display part of the mobile apparatus and moves the display part away from the main body by a predetermined distance to adjust a rotation angle of the display part. To do so, the display part of the mobile apparatus is hinged to the main body.

FIG. 1 illustrates an example of a conventional rotatable hinge device. Referring to FIG. 1, a conventional rotatable hinge device 10 comprises a main bracket 11 having a hinge unit 18, a shaft 12 rotatably engaged with a penetrating opening 11a of the main bracket 11, a pair of cams 13 and 14 that fit over the shaft 12 and restrain rotation of the main bracket 11, and an elastic member 15 disposed between the pair of cams 13 and 14 and the penetrating opening 11a to press the main bracket 11. A detector 16 may be formed above the cam 13 to operate a rotating angle sensing switch (not shown). A fixing member 17 is fixed under the shaft 12, and the elastic member 15 may include a spring washer. The pair of cams 13 and 14 comprise a lower cam 14 having a protrusion 14a to form the sense of a click when rotating, and an upper cam 13 having a recess 13a to receive the protrusion 14a. Accordingly, when the rotatable hinge device 10 rotates, the lower cam 14 and the upper cam 13 are placed into friction contact with each other so that the hinge implements a free stop movement, and the protrusion 14a of the lower cam 14 and the recess 13a of the upper cam 13 impart the feeling of a click. The phrase free stop movement refers to the ability to stop at an arbitrary rotational angle, and hereinafter will be referred to as a free stop.

FIG. 2 is a front view of the rotatable hinge device when the rotatable hinge device is engaged with a mobile apparatus. As shown in FIG. 2, the rotatable hinge device 10 having the fixing member 17 of the shaft 12 engaged with the display part 2 is connected to the main body 3 of the mobile apparatus by a hinge unit 18 of the main bracket 11.

FIGS. 3A and 3B are views of an upright camcorder 1 with the rotatable hinge device 10. FIG. 3A shows the display part 2 closed, and FIG. 3B shows the display part 2 opened.

Referring to FIGS. 3A and 3B, the display part 2 of the upright camcorder 1 can be rotated about an X axis of FIG. 3B by the rotatable hinge device 10 so that the display part 2 can be opened from the main body 3. When opened, the display part 2 can be rotated about a Z axis of an X-Y plane of FIG. 3B, that is, from the main body 3, by the shaft 12. Accordingly, a user rotates the display part 2 to adjust an angle of a screen when the display part 2 is opened from the main body 3. The upright camcorder 1 observes a subject using the display part 2 such as a liquid crystal display (LCD) instead of a general viewfinder.

The conventional rotatable hinge device 10 has relatively large-sized parts, such as the main bracket, so it occupies a large space in the mobile apparatus. Compact mobile apparatuses, such as an upright camcorder that uses a hard drive or flash memory, requires a more compact hinge device in comparison with a mobile apparatus that uses a deck unit and a magnetic recording medium. Additionally, part of the conventional hinge device is exposed to the outside by an installation line L1. This interferes with the aesthetics of the mobile apparatus.

Accordingly, there is a need for a more compact hinge device for a mobile apparatus.

SUMMARY OF THE INVENTION

An aspect of the present invention is to address at least the above problems and/or disadvantages and to provide at least the advantages described below. Accordingly, an aspect of the present invention is to provide an improved hinge device that can be installed in a smaller area in comparison with a conventional rotatable hinge device.

Another aspect of the present invention is to provide a hinge device which does not reveal an installation line when installed in a mobile apparatus so that the mobile apparatus has a more refined design.

Yet another aspect of the present invention is to provide a mobile apparatus having the hinge device.

In accordance with an aspect of the present invention, a hinge device includes a sliding unit that slides with respect to a main body of a mobile apparatus; and a rotary unit disposed on the sliding unit to rotatably engage a display part of a mobile apparatus.

The sliding unit may include a sliding body, and a first connection portion to engage the sliding body with the main body.

The sliding body may be curved.

The sliding body may include a first connection opening to receive the first connection portion, and a second connection opening to receive the rotary unit.

The rotary unit may include a rotary body engaging the display part, a first rotary shaft formed in the rotary body to be inserted in the second connection opening, a cam formed at the first rotary shaft to control a rotating of the rotary body, and a second elastic member formed in the first rotary shaft to press the cam.

The rotary body according to an exemplary embodiment of the present invention may include a fixing member to fix the display part.

The rotary body according to another exemplary embodiment of the present invention may include a second connection portion to rotatably engage the display part.

The second connection portion may include a third elastic member inserted in an axial opening formed on the rotary body, and second rotary shafts elastically supported at opposite ends of the third elastic member to protrude outside the rotary body.

The cam may include a first cam having a protrusion, and a second cam having a protrusion receiving recess corresponding to the protrusion.

The rotary unit may further include a detector to sense a rotational angle of the first rotary shaft.

The first connection portion may protrude from the sliding body.

The first connection portion may include a first elastic member inserted in the first connection opening, and guide protrusions elastically supported at opposite ends of the first elastic member to protrude outside the sliding body.

The guide protrusions may slide along a guide recess formed in the main body.

In accordance with another aspect of the present invention, a mobile apparatus includes a main body, a display part, and a hinge device to slidingly open and close the display part with respect to the main body.

The hinge device may slidingly open and close the display part and then allow the display part to rotate.

The hinge device may include a sliding unit that slides with respect to a main body of a mobile apparatus; and a rotary unit disposed on the sliding unit to rotatably engage a display part of a mobile apparatus.

The sliding unit may include a sliding body, and a first connection portion to engage the sliding body with the main body.

The sliding body may be curved.

The sliding body may include a first connection opening to receive the first connection portion, and a second connection opening to receive the rotary unit.

The rotary unit may include a rotary body engaging the display part, a first rotary shaft formed in the rotary body to be inserted in the second connection opening, a cam formed at the first rotary shaft to control a rotating of the rotary body, and a second elastic member formed in the first rotary shaft to press the cam.

The rotary body according to an exemplary embodiment of the present invention may include a fixing member to fix the display part.

The rotary body according to another exemplary embodiment of the present invention may include a second connection portion to rotatably engage the display part.

The second connection portion may include a third elastic member inserted in an axial opening formed on the rotary body, and second rotary shafts elastically supported at opposite ends of the third elastic member to protrude outside the rotary body.

The cam may include a first cam having a protrusion, and a second cam having a protrusion receiving recess corresponding to the protrusion.

The rotary unit may further include a detector to sense a rotational angle of the first rotary shaft.

The first connection portion may protrude from the sliding body.

The first connection portion may include a first elastic member inserted in the first connection opening, and guide protrusions elastically supported at opposite ends of the first elastic member to protrude outside the sliding body.

The guide protrusions may slide along a guide recess formed in the main body.

The rotary unit may further include a detector to sense a rotating angle of the first rotary shaft.

The hinge device may be formed at an edge inside the display part.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
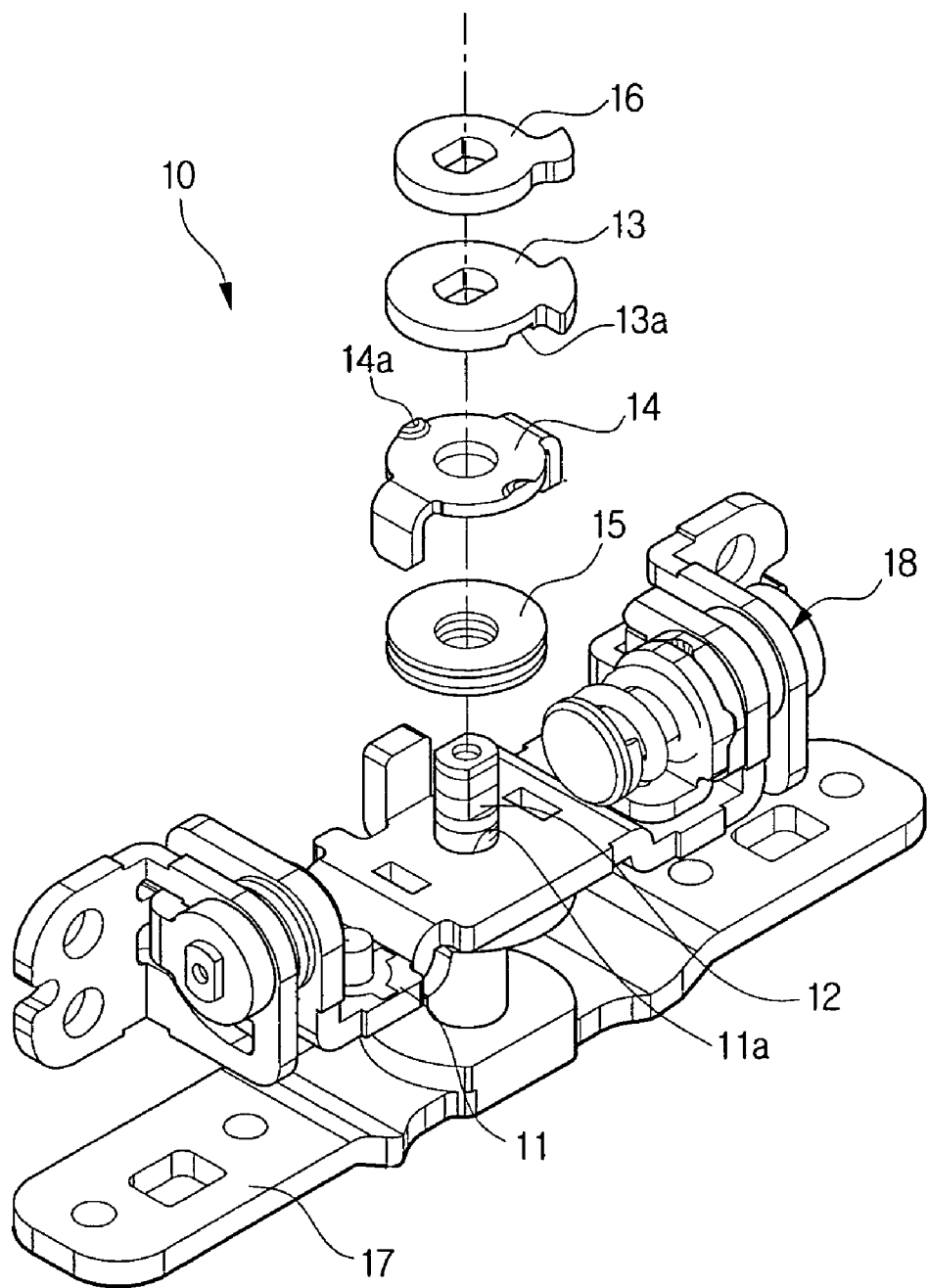
FIG. 1 is a perspective view of a conventional hinge device.
Figure 2:
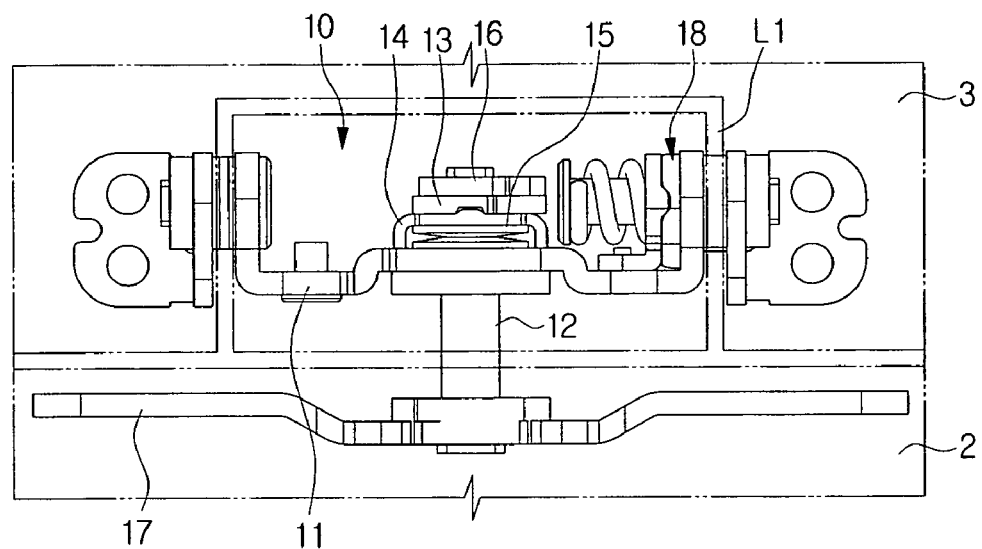
FIG. 2 is a front view of the hinge device of FIG. 1 when installed in a mobile apparatus.
Figure 3A:
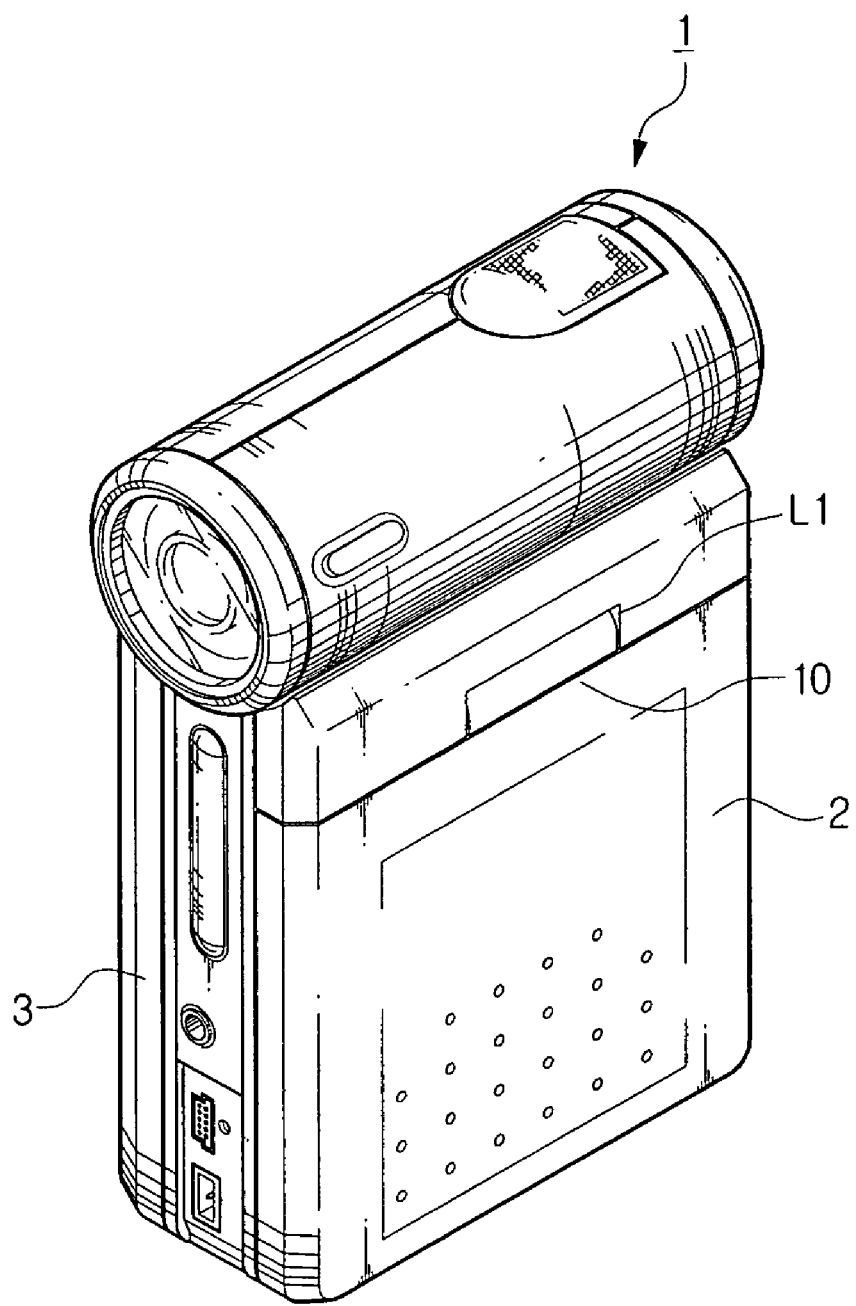
FIG. 3A is a perspective view of an upright camcorder having the hinge device of FIG. 1 with the display part closed.
Figure 3B:
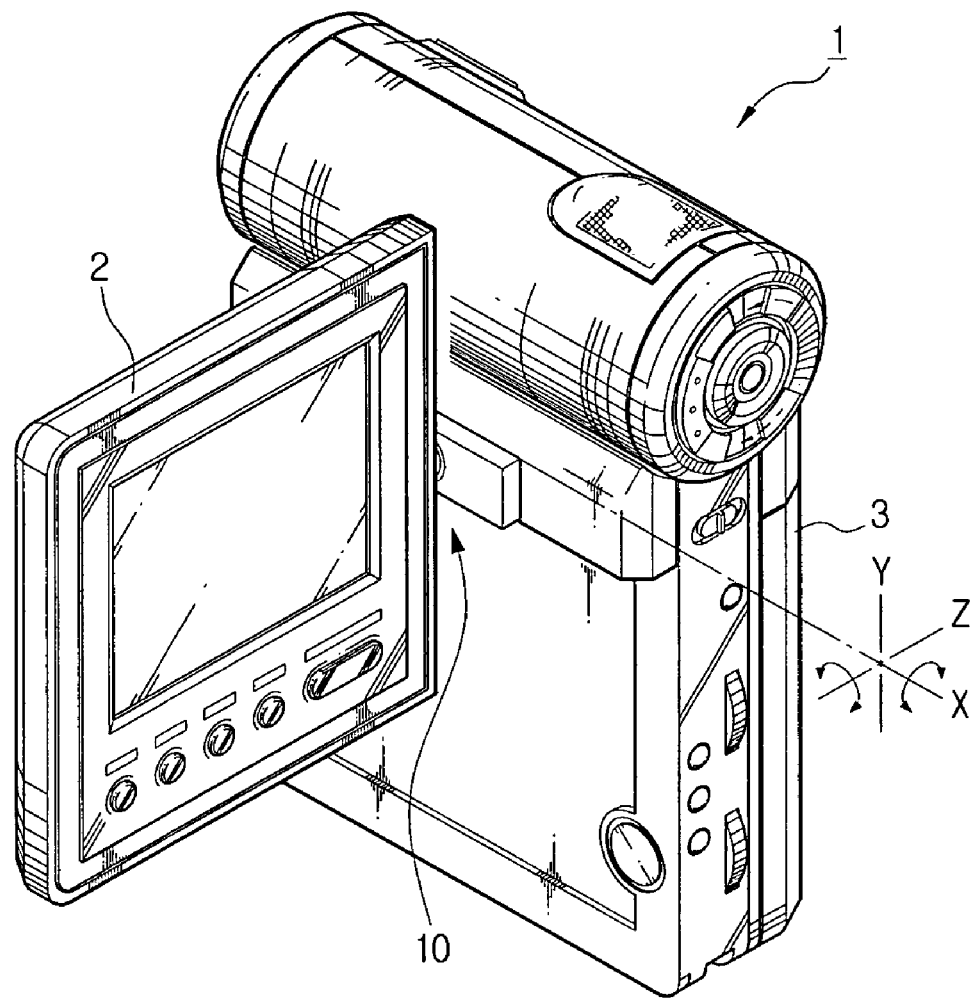
FIG. 3B is a perspective view of an upright camcorder having the hinge device of FIG. 1 with the display part opened.
Figure 4A:
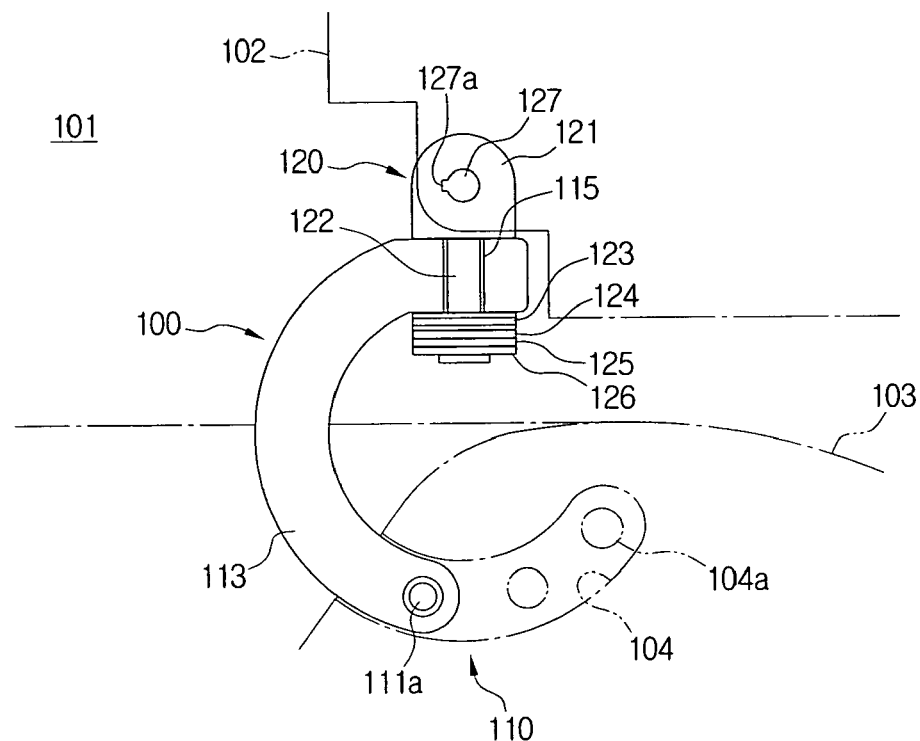
FIG. 4A is a front view of a hinge device according to a first exemplary embodiment of the present invention.
Figure 4B:
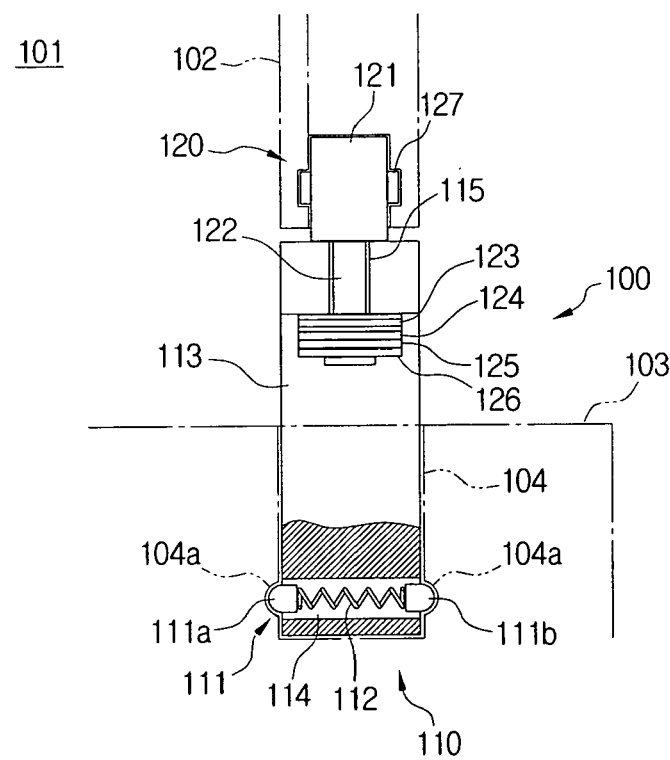
FIG. 4B is a side view of the hinge device of FIG. 4A.
Figure 5:
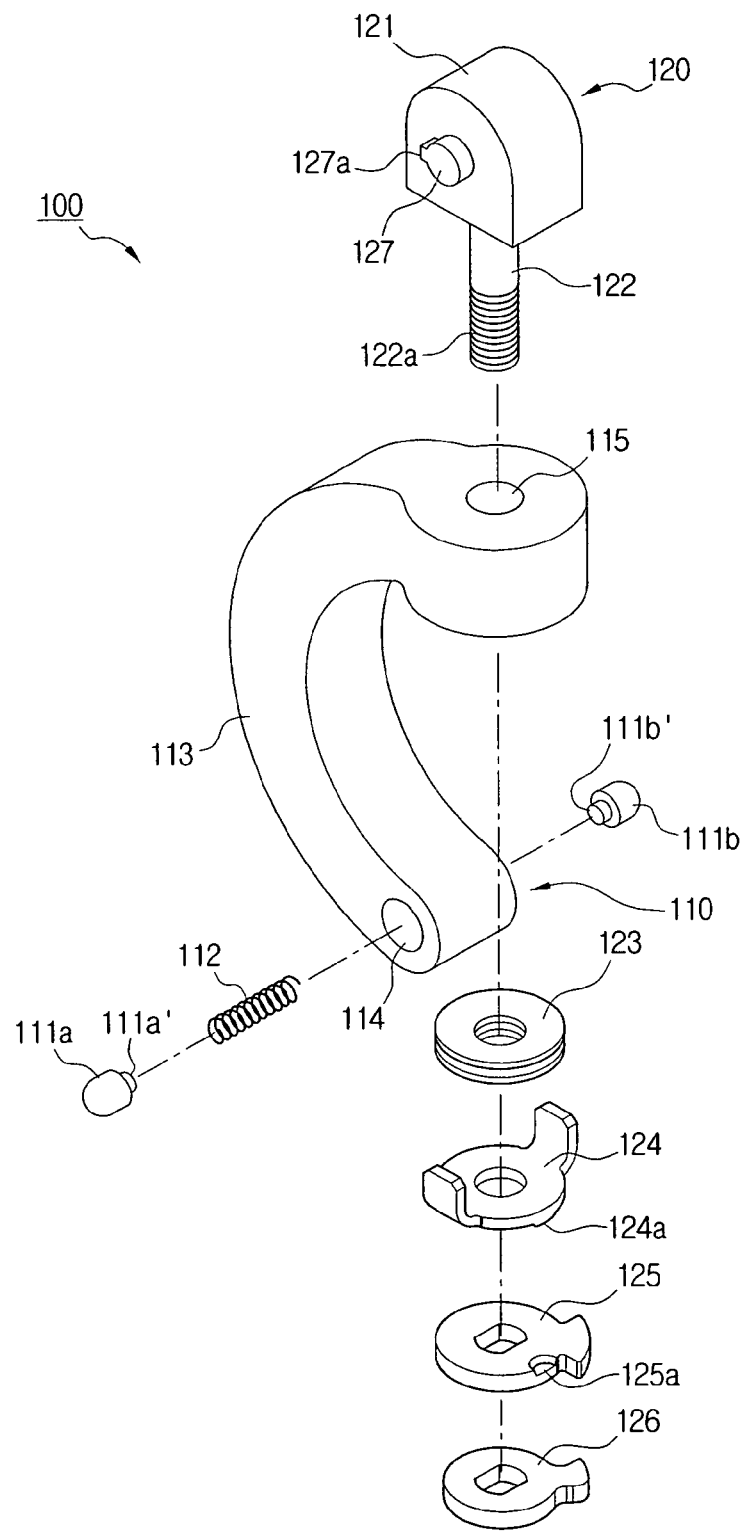
FIG. 5 is an exploded perspective view illustrating the hinge device of FIGS. 4A and 4B.

FIG. 4A is a front view of a hinge device according to a first exemplary embodiment of the present invention, FIG. 4B is a side view of the hinge device of FIG. 4A, and FIG. 5 is an exploded perspective view of the hinge device of FIG. 4A.

Referring to FIGS. 4A, 4B, and 5, a hinge device 100 according to the first exemplary embodiment of the present invention comprises a sliding unit 110 and a rotary unit 120.

The sliding unit 110 comprises a sliding body 113 with a certain curvature and a first connection portion 111 to engage the sliding body 113 with a main body of a mobile apparatus.

A first connection opening 114 is disposed at a first end of the sliding body 113 and a second connection opening 115 is disposed at a second end of the sliding body 113. The second connection opening 115 is substantially perpendicular to the first connection opening 114. The first connection opening 114 receives the first connection portion 111, and the second connection opening 115 receives the rotary unit 120. Because the sliding body 113 has a certain curvature, a display part 102 engaged with the sliding body 113 can be opened and closed along the curved passage from a main body 103. Additionally, the sliding body 113 is slid along a guide recess 104 formed in the main body 103 so as to be hidden in the main body 103. The curvature of the sliding body 113 can be arbitrarily set depending on the size or specification of a product.

The first connection portion 111 comprises a first elastic member 112 inserted in the first connection opening 114, and a pair of guide protrusions 111a and 111b. Opposite ends of the first elastic member 112 have a first guide protrusion 111a and a second guide protrusion 111b, respectively. The first and the second guide protrusions 111a and 111b protrude to the outside of the sliding body 113. The pair of guide protrusions 111a and 111b may have round or hemispherical surfaces. For example, the pair of guide protrusions 111a and 111b may be round balls or round rods. The pair of guide protrusions 111a and 111b each may have engagement protrusions 111a' and 111b' which face inward into the first connection opening 114 so as to be connected with the first elastic member 112. The first elastic member 112 fits over each engagement protrusion 111a' and 111b' of the pair of guide protrusions 111a and 111b to push the pair of guide protrusions 111a and 11b outward. Therefore, when the pair of guide protrusions 111a and 11b are slid along the guide recess 104 inside of the main body 103, the display part 102 engaged with the sliding body 113 can be arbitrarily stopped at any desired angle. In other words, a free stop can be implemented. The first connection portion 111 may be provided in various forms if the sliding body 113 is guided along the guide recess 104 to perform a free stop movement. One of the features of the hinge device 100 according to the first exemplary embodiment of the present invention is that the display part 102 is engaged by the sliding body 113.

The rotary unit 120 comprises a rotary body 121, a first rotary shaft 122, a second elastic member 123 and a pair of cams 124 and 125.

The rotary body 121 extends from the first rotary shaft 122 toward the display part 102 to engage with the display part 102. In the hinge device 100 according to the first exemplary embodiment of the present invention, the rotary body 121 engages the display part 102 by a fixing member 127. In a hinge device 200 (refer to FIG. 8) according to a second exemplary embodiment of the present invention, which will be explained later, a rotary body 221 engages a display part 202 by a second connection portion 230. In the hinge device 100 according to the first exemplary embodiment of the present invention, the fixing member 127 is inserted in a fixing recess (not shown) of the display part 102 so as to engage the rotary body 121 with the display part 102. The fixing member 127 may extend from a center of the rotary body 121 as a single member. Or, a separate axial opening may be formed on a central portion of the rotary body 121 and a bar shaped fixing member 127 may be inserted in the opening. Regardless of the shape, the fixing member 127 has a fixing protrusion 127a so that the rotary body 121 does not separately rotate about the first rotary shaft 122.

The first rotary shaft 122 is rotatably engaged with a sliding unit 110, more specifically, the second connection opening 115 of the sliding body 113. Screw threads are formed at one end of the first rotary shaft 122, and the second elastic member 123 and the pair of cams 124 and 125 are sequentially engaged with the first rotary shaft 122. Although not shown, a separate cap is fastened with the screw threads of the first rotary shaft 122 to restrain the second elastic member 123 and the pair of cams 124 and 125. The first rotary shaft 122 and the rotary body 121 may be integrally formed. The first rotary shaft 122 may further include a detector 126. The detector 126 is disposed above the pair of cams 124 and 125 to operate a rotary angle sensing switch (not shown) of the first rotary shaft 122.

The second elastic member 123 fits over the first rotary shaft 122 to press the pair of cams 124 and 125. The second elastic member 123 may include a spring washer.

The pair of cams 124 and 125 engage the second elastic member 123 of the first rotary shaft 122. The pair of cams 124 and 125 control rotation of the rotary body 121. The pair of cams 124 and 125 comprise a first cam 124 having a protrusion 124a, and a second cam 125 having a protrusion receiving recess 125a corresponding to the protrusion 124a. The pair of cams 124 and 125 generate the sense of a click when the first rotary shaft 122 rotates. Accordingly, when the first rotary shaft 122 rotates, the second elastic member 123 presses the first cam 124 and the second cam 125 together to generate friction so that a free stop rotary movement can be implemented and so that the protrusion receiving recess 125a of the second cam 125 and the protrusion 124a of the first cam 124 generate the sense of a click.

The above configuration of the rotary unit 120 should not be considered as limiting. The configuration of the rotary unit 120 according to the first exemplary embodiment of the present invention may be varied if the display part 102 can be rotated based on 2 axes.

The mobile apparatus 101 having the hinge device 100 according to the first exemplary embodiment of the present invention comprises the main body 103, the display part 102, which can output image information from the main body 103, and the hinge device 100.

The guide recess 104 is formed in the main body 103 for accommodating the hinge device 100 so that it may slide. The shape of the curved guide recess 104 corresponds to the shape of the sliding body 113. Accordingly, the hinge device 100 allows the display part 102 to be opened and closed along the guide recess 104 with respect to the main body 103. Additionally, the hinge device 100 is engaged by the sliding body 113 and slides along the guide recess 104 so that the space required by the hinge device 100 can be significantly reduced.

The mobile apparatus 101 according to the first exemplary embodiment of the present invention may have the hinge device 100 on an inner surface of a top end of the display part 102. If formed on the inner surface of the display part 102, the hinge device 100 is hidden from the exterior of the display part 102.

Figure 6:
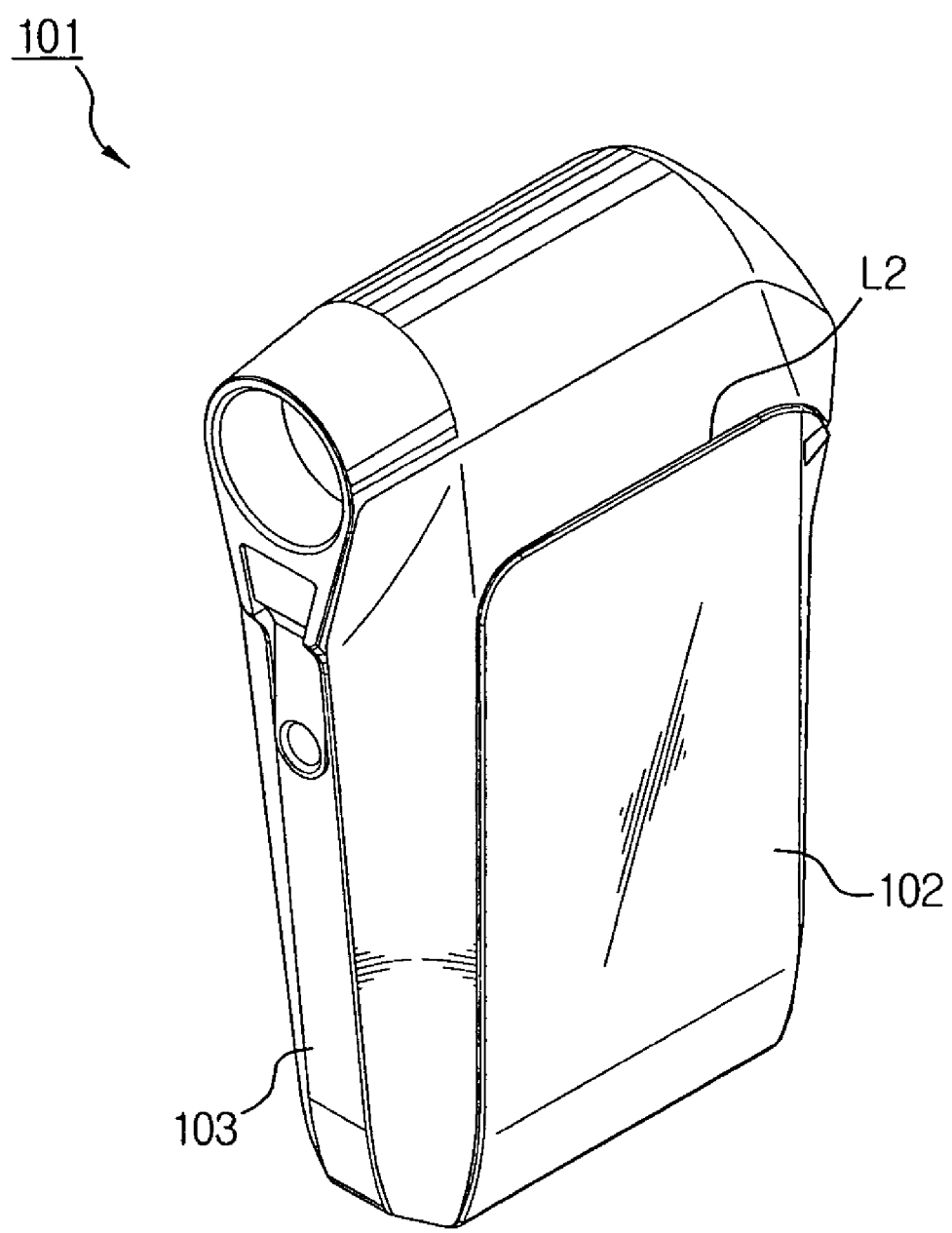
FIG. 6 is a perspective view of the exterior of an upright camcorder having the hinge device of FIGS. 4A and 4B.

FIG. 6 is a view of the exterior of an exemplary mobile apparatus (an upright camcorder) having the hinge device according to the first exemplary embodiment of the present invention. As shown in FIG. 6, the mobile apparatus 101 having the hinge device 100 according to the first exemplary embodiment of the present invention has no line at a portion where the hinge device 100 is installed and only an exterior line L2 at the top end of the display part 102 so that a more refined design is possible.

The operation of the mobile apparatus having the hinge device according to the first exemplary embodiment of the present invention will now be described with reference to the accompanying drawings.

FIGS. 7A through 7E illustrate the operation of an upright camcorder, which is a representative example of a mobile apparatus, having the hinge device according to the first exemplary embodiment of the present invention. As shown in FIGS. 7A through 7E, the hinge device 100 is engaged with one end of the upper portion of the display part 102 of the upright camcorder 101.

Figure 7A:
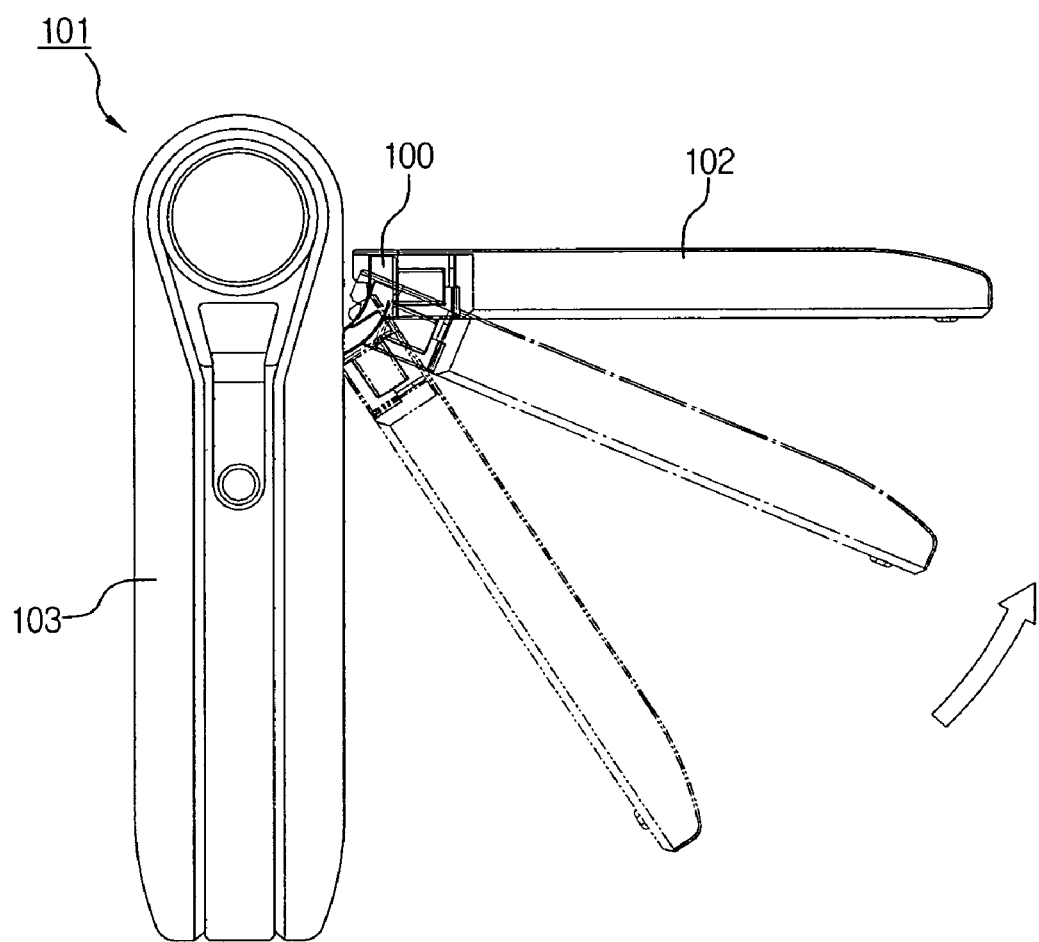
FIG. 7A through 7E are views illustrating the operation of an upright camcorder having a hinge device according to a first exemplary embodiment of the present invention.
Figure 7B:
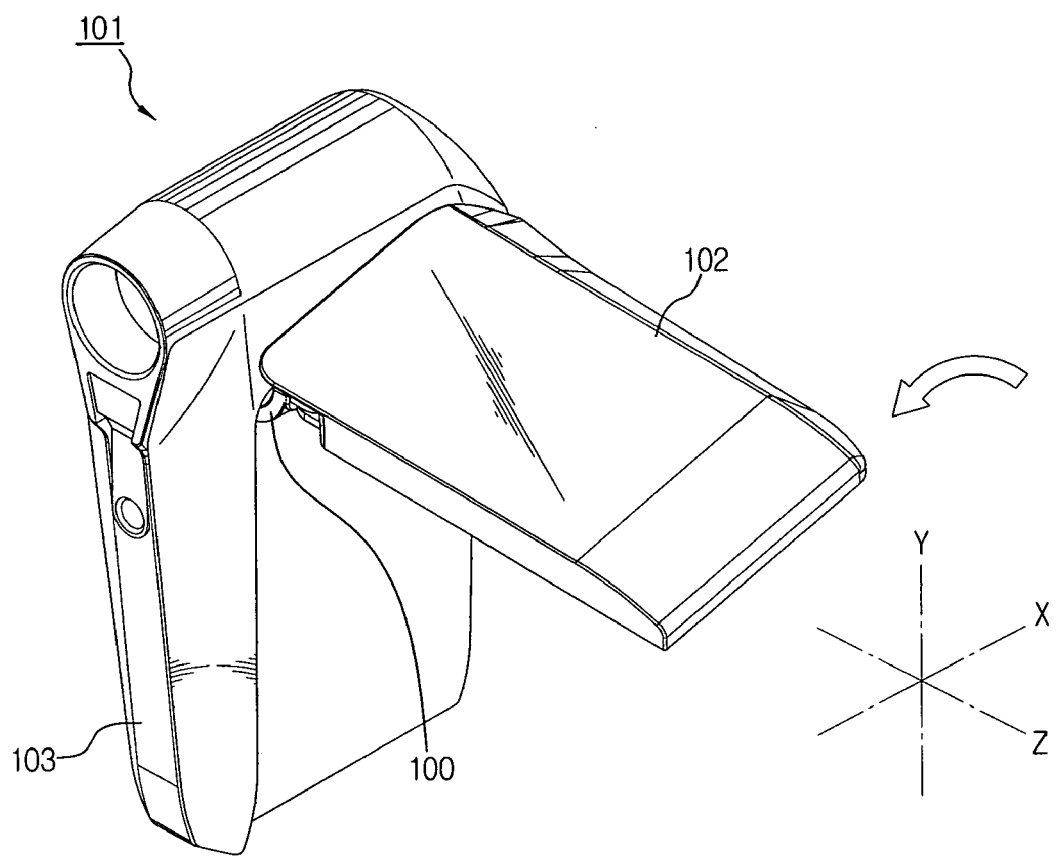

First, as shown in FIGS. 4A and 7A, in the upright camcorder 101 according to the first exemplary embodiment of the present invention, the sliding body 113 of the hinge device 100 is slid along the guide recess 104 of the main body 103 to open and close the display part 102. During this movement, the display part 102 may perform a free stop at any desired angle, as shown in dotted lines of FIG. 7A Additionally, regardless of the degree to which the sliding body 113 is opened and closed, the display part 102 can be rotated on an X-Y plane from the sliding body 113, that is, rotated about a Z axis, by the rotary unit 120, as shown in FIG. 7B.

Figure 7C:
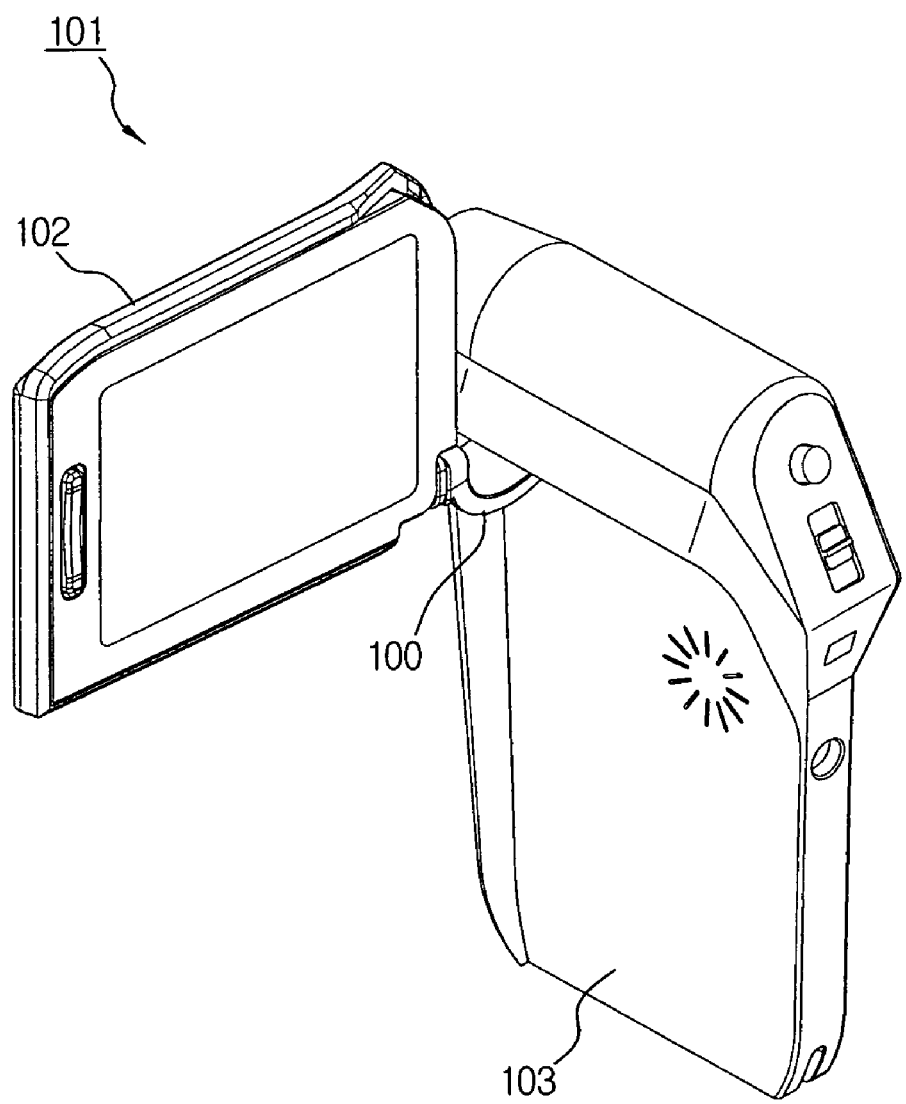

FIG. 7C illustrates a moving image photographing mode of the upright camcorder 101. This mode is convenient for a user to photographing a moving image while holding the upright camcorder 101 in the user's hands and viewing the display part 102.

Figure 7D:
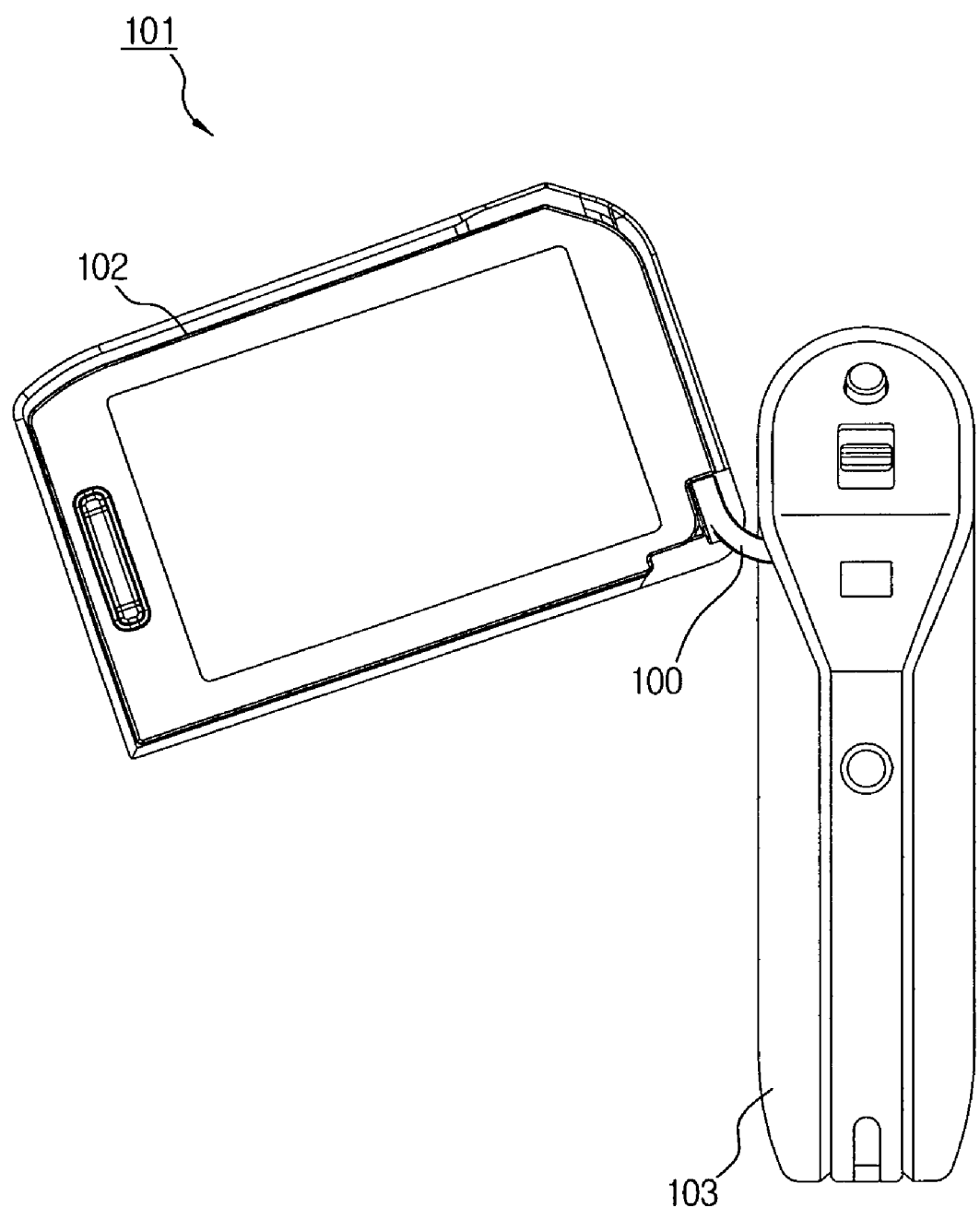
Figure 7E:
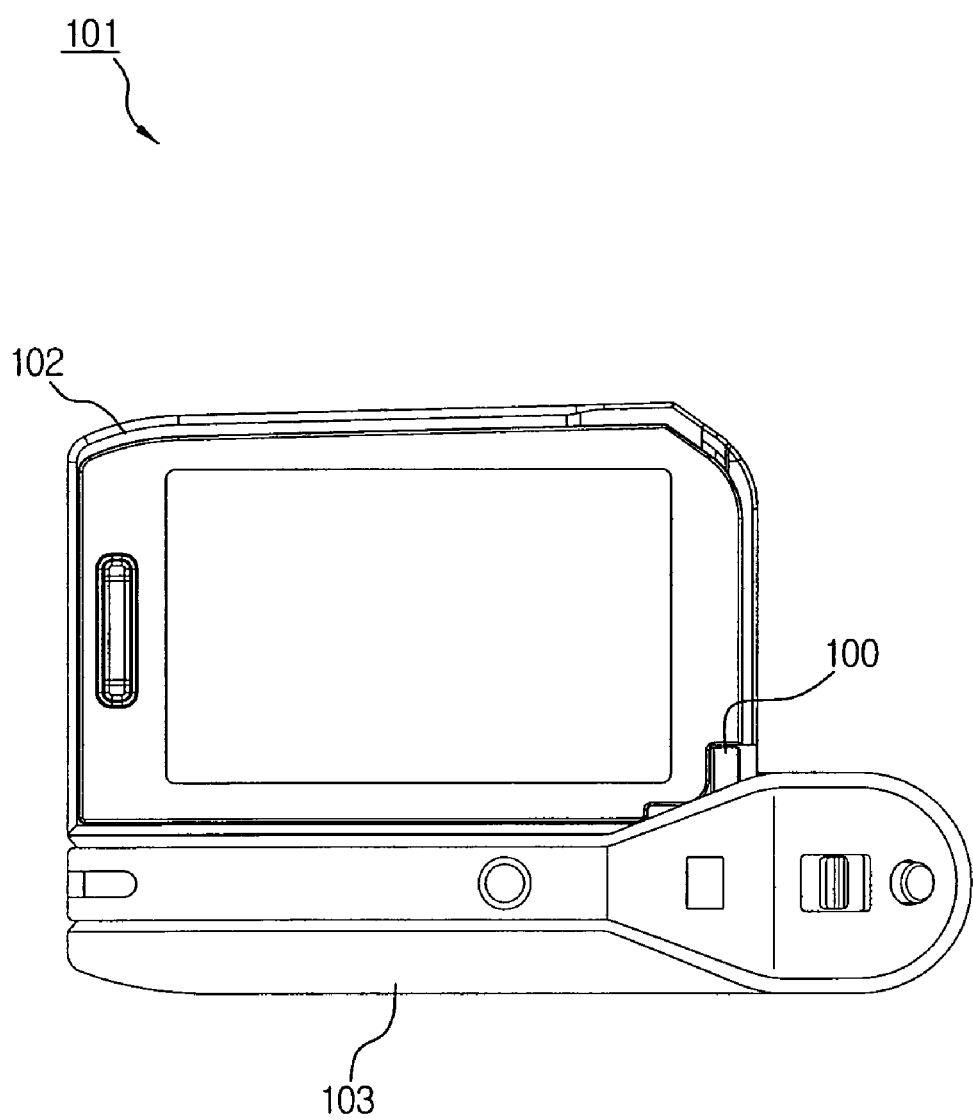

While in the moving image photographing mode of FIG. 7C, the sliding body 113 may be slid into the main body 103, as illustrated in FIG. 7D. When the sliding body 113 is slid into the main body 103, the upright camcorder 101 moves into the position shown in FIG. 7E. FIG. 7E illustrates a still image photographing mode. This mode is convenient for photographing a still image or reproducing and viewing still images. The mode of FIG. 7E provides a landscape mode, and is also suitable for watching digital multimedia broadcasting (DMB).

As described above, the mobile apparatus according to the first exemplary embodiment of the present invention has a display part that can be freely, smoothly, and conveniently operated.

Figure 8:
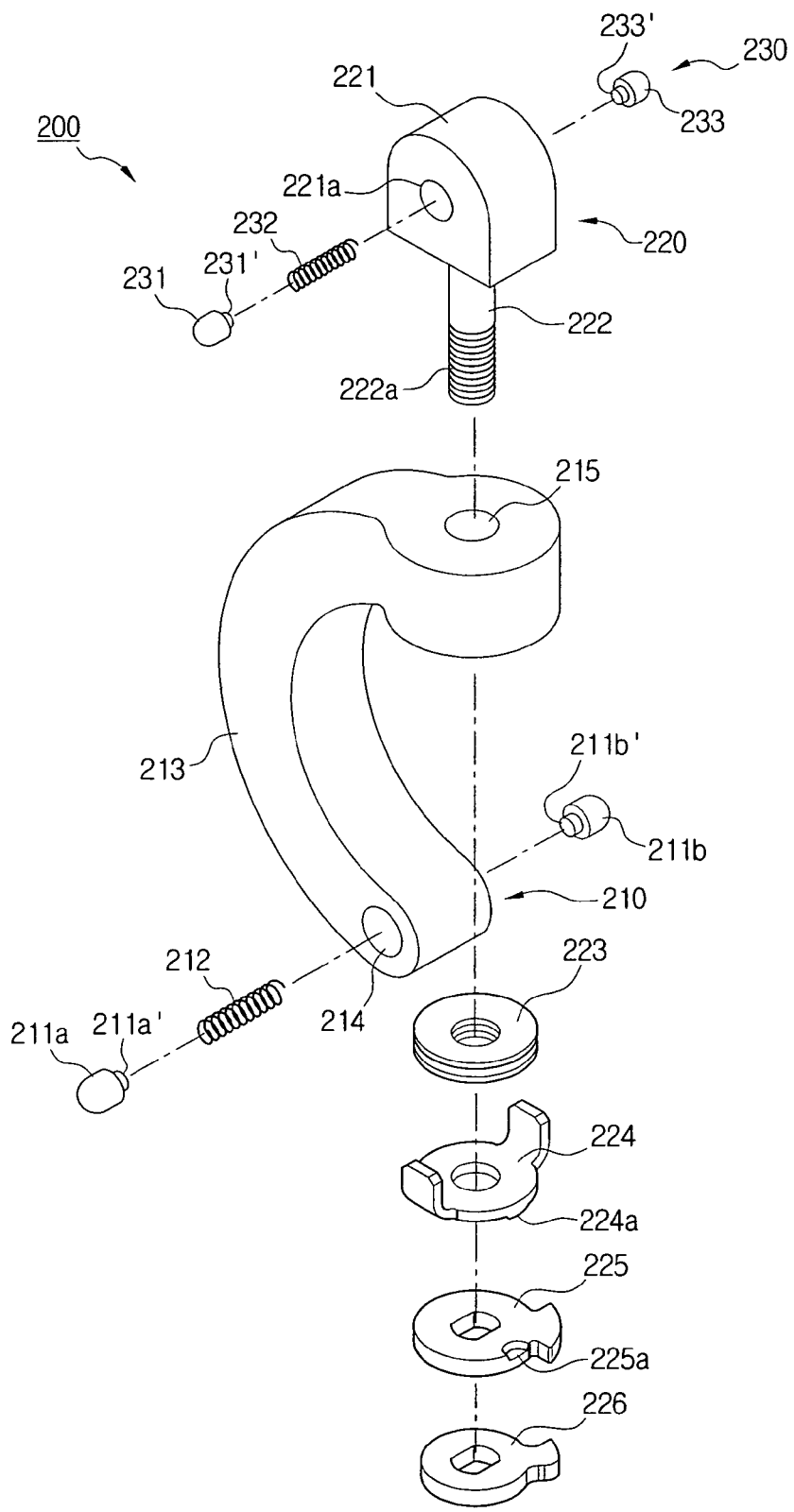
FIG. 8 is an exploded perspective view illustrating a hinge device according to a second exemplary embodiment of the present invention.

FIG. 8 is an exploded perspective view of a hinge device according to a second exemplary embodiment of the present invention.

Referring to FIG. 8, the hinge device 200 according to the second exemplary embodiment of the present invention has a structure in which the rotary body 221 of the rotary unit 220 is engaged with the display part 202 by a second connection portion 230 as briefly described above. The second connection portion 230 of the rotary body 221 according to the second exemplary embodiment of the present invention may have the same structure as the first connection portion 111 according to the first exemplary embodiment of the present invention.

In detail, the second connection portion 230 comprises a third elastic member 232 and a pair of second rotary shafts 231 and 233. The pair of second rotary shafts 231 and 233 protrude to the outside of the rotary body 221. The surfaces of the pair of second rotary shafts 231 and 233 may be round or hemispherical. For example, the pair of second rotary shafts 231 and 233 may be round balls or round rods. The pair of second rotary shafts 231 and 233 each may have engagement protrusions 231' and 233' which extend inward into an axial opening 221a so as to be connected with the third elastic member 232. The third elastic member 232 fits over each of the engagement protrusions 231' and 233' of the pair of second rotary shafts 231 and 233 to push the pair of second rotary shafts 231 and 233 outward. Accordingly, the pair of second rotary shafts 231 and 233 allow the display part 102 to arbitrarily stop at a desired angle, that is, a free stop can be implemented. For a more effective free stop function, the display part 202 has hemispheric recesses that correspond to the engagement protrusions 231' and 233' of the second rotary shafts 231 and 233 of the hinge device 200 according to the second exemplary embodiment of the present invention.

The remaining portions of the hinge device 200 are substantially the same as the hinge device 100 according to the first embodiment of the invention. Therefore, a detailed description of these portions will not be repeated for conciseness.

Figure 9A:
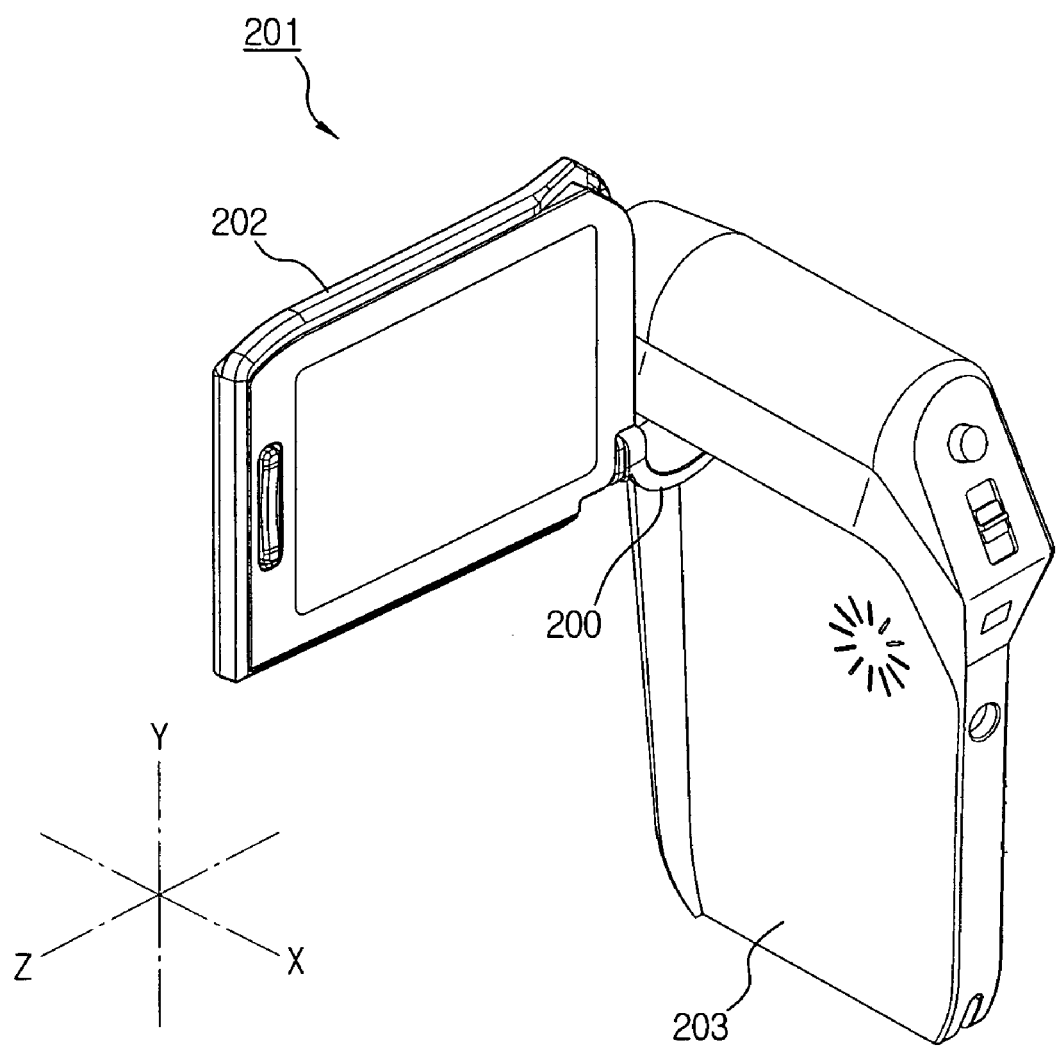
FIGS. 9A and 9B are views illustrating the operation of an upright camcorder having a hinge device according to a second exemplary embodiment of the present invention.
Figure 9B:
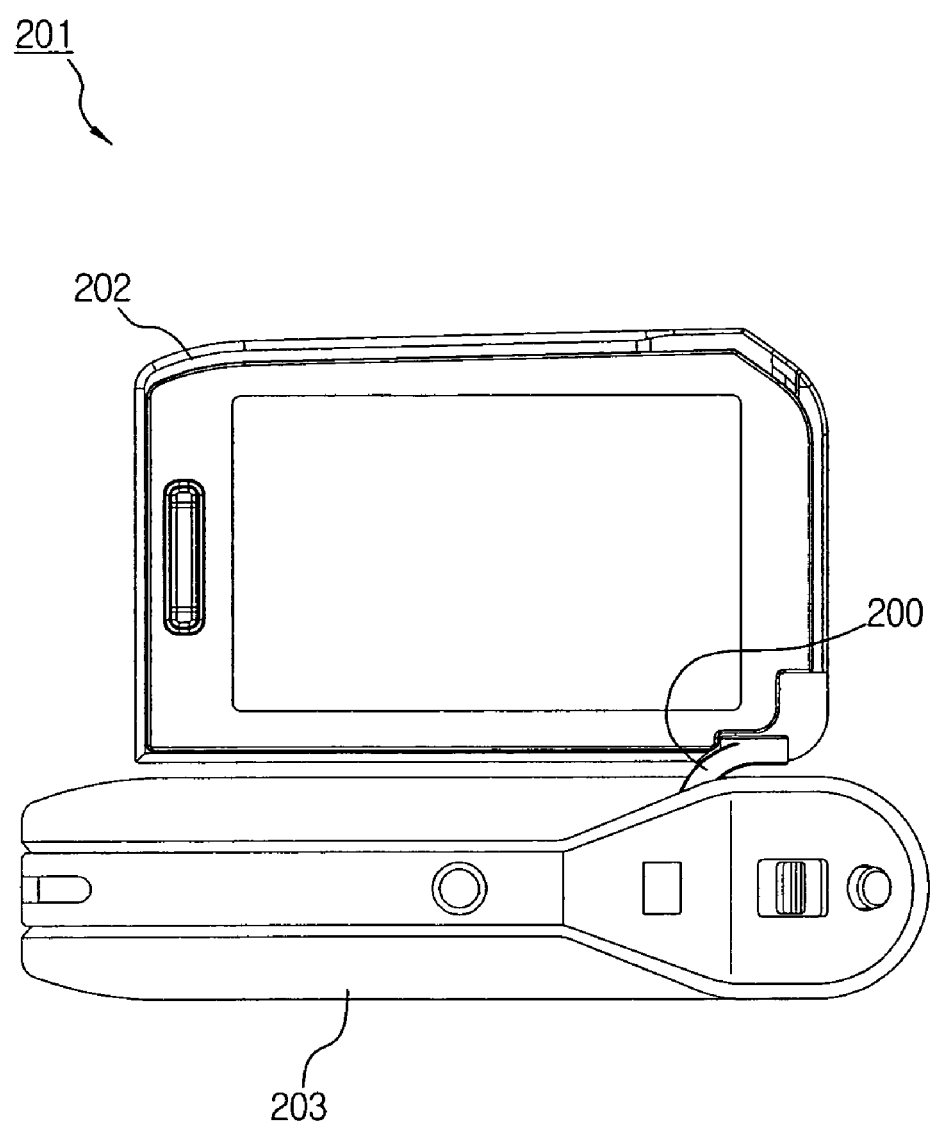

FIGS. 9A and 9B are views illustrating the operation of an upright camcorder having the hinge device 200 according to the second exemplary embodiment of the present invention. Referring to FIGS. 9A and 9B, the hinge device 200 according to the second exemplary embodiment of the present invention is engaged with one end of an upper portion of the display part 202 of the upright camcorder 201.

The upright camcorder 201 according to the second exemplary embodiment of the present invention can be rotated about an X axis by the sliding body 213. Specifically, even when the sliding body 213 is not slid into a main body 203, the upright camcorder 201 according to the second exemplary embodiment of the present invention can directly translate from the moving image photographing mode of FIG. 9A into the landscape mode of FIG. 9B by rotation of the second connection member 230.

The hinge device according to the exemplary embodiments of the present invention can be installed in a smaller space than a conventional rotatable hinge device so that the mobile apparatus may be more compact.

Further, a mobile apparatus having the hinge device according to exemplary embodiments of the present invention has no line for engaging the hinge device so that it has a more refined design in comparison with a conventional mobile apparatus.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A hinge device for a mobile apparatus which includes a main body having a curved guide recess formed therein and a display part, the hinge device comprising:
   a sliding unit having a sliding body; and
   a rotary unit rotatably connecting the display part to the sliding unit;
   wherein the sliding body has a shape corresponding to the shape of the guide recess and is slidable along the guide recess so that the display part can rotate with respect to the main body so as to be opened or closed.

2. The hinge device according to claim 1, wherein the sliding unit further comprises
   a first connection portion to engage the sliding body with the main body.

3. The hinge device according to claim 2, wherein the sliding body comprises:
   a first connection opening to receive the first connection portion; and
   a second connection opening to receive the rotary unit.

4. The hinge device according to claim 3, wherein the rotary unit comprises:
   a rotary body engaging the display part;
   a first rotary shaft disposed on the rotary body to be inserted in the second connection opening;
   a cam formed at the first rotary shaft to control rotation of the rotary body; and
   an elastic member disposed on the first rotary shaft to press the cam.

5. The hinge device according to claim 4, wherein the rotary body comprises a fixing member to fix the display part.

6. The hinge device according to claim 4, wherein the rotary body comprises a second connection portion rotatably engaged with the display part.

7. The hinge device according to claim 6, wherein the second connection portion comprises:
   another elastic member inserted in an axial opening of the rotary body; and
   second rotary shafts elastically supported at opposite ends of the another elastic member to protrude outside the rotary body.

8. The hinge device according to claim 4, wherein the cam comprises:
   a first cam having a protrusion; and
   a second cam having a protrusion receiving recess corresponding to the protrusion.

9. The hinge device according to claim 4, wherein the rotary unit further comprises a detector to sense a rotation angle of the first rotary shaft.

10. The hinge device according to claim 1, wherein the first connection portion protrudes from the sliding body.

11. The hinge device according to claim 10, wherein the first connection portion comprises:
   an elastic member inserted in the first connection opening; and
   guide protrusions elastically supported at opposite ends of the elastic member to protrude outside the sliding body.

12. The hinge device according to claim 11, wherein the guide protrusions slide along the guide recess in the main body.

13. A mobile apparatus comprising:
   a main body having a curved guide recess formed therein;
   a display part; and
   a hinge device, which includes a sliding unit having a sliding body, and a rotary unit rotatably connecting the display part to the sliding unit;
   wherein the sliding body has a shape corresponding to the shape of the guide recess and is slidable along the guide recess so that the display part can rotate with respect to the main body so as to be opened or closed.

14. The mobile apparatus according to claim 13, wherein the sliding unit further comprises:
   a first connection portion to engage the sliding body with the main body.

15. The mobile apparatus according to claim 14, wherein the sliding body comprises:
   a first connection opening to receive the first connection portion; and
   a second connection opening to receive the rotary unit.

16. The mobile apparatus according to claim 15, wherein the rotary unit comprises:
   a rotary body engaging the display part;
   a first rotary shaft disposed on the rotary body to be inserted in the second connection opening;
   a cam formed at the first rotary shaft to control rotation of the rotary body; and
   an elastic member disposed on the first rotary shaft to press the cam.

17. The mobile apparatus according to claim 16, wherein the rotary body comprises a fixing member to fix the display part.

18. The mobile apparatus according to claim 16, wherein the rotary body comprises a second connection portion rotatably engaged with the display part.

19. The mobile apparatus according to claim 18, wherein the second connection portion comprises:
   another elastic member inserted in an axial opening of the rotary body; and
   second rotary shafts elastically supported at opposite ends of the another elastic member to protrude outside the rotary body.

20. The mobile apparatus according to claim 16, wherein the cam comprises:
   a first cam having a protrusion; and
   a second cam having a protrusion receiving recess corresponding to the protrusion.

21. The mobile apparatus according to claim 16, wherein the rotary unit further comprises a detector to sense a rotation angle of the first rotary shaft.

22. The mobile apparatus according to claim 14, wherein the first connection portion protrudes from the sliding body.

23. The mobile apparatus according to claim 14, wherein the first connection portion comprises:
   an elastic member inserted in the first connection opening; and
   guide protrusions elastically supported at opposite ends of the elastic member to protrude outside the sliding body.

24. The mobile apparatus according to claim 23, wherein the guide protrusions slide along a guide recess in the main body.

25. The mobile apparatus according to claim 13, wherein the hinge device is disposed in the display part.

26. The mobile apparatus according to claim 25, wherein the hinge device is disposed at an edge of the display part.

* * * * *